United States Patent Office 3,219,476
Patented Nov. 23, 1965

3,219,476
METHOD OF ENCAPSULATION OF AEROSOLS BY IN SITU POLYMERIZATION
Robert C. Robbins, Menlo Park, Calif., assignor to Stanford Research Institute, Menlo Park, Calif., a corporation of California
No Drawing. Filed July 10, 1963, Ser. No. 294,166
21 Claims. (Cl. 117—100)

This invention relates to the encapsulation of aerosol particles during or immediately following the dispersion into the gas phase. More particularly, the invention concerns the encapsulation of aerosol particles wherein the aerosol is utilized as condensation nuclei on which organic monomers simultaneously polymerize and condense.

It has been found that it would be particularly desirable to encapsulate aerosolized highly reactive and dangerous products. Primarily, it has been determined that the encapsulation of aerosolized chemical warfare agents would modify the properties of these systems and increase their effectiveness. An additional need for the encapsulation of aerosolized products arises in a temporary protection for particles in a multi-step series of chemical reactions between different aerosol products or between aerosol particles and gases. Specifically, the encapsulation serves to modify the active aerosol so as to keep it active for a longer period of time. Additionally, the encapsulation protects the aerosol from adverse conditions in its environment such as preventing the hydrolysis of the agent by atmospheric water vapor.

Prior to the present invention, the encapsulation of aerosols in situ was an extremely difficult task to accomplish. An aerosol is a colloidal system of liquid or solid particles with gas as the surrounding medium. The aerosol systems which are used in the present invention may be synthetically produced. In order to be fully effective, the encapsulation of this invention must occur in a relatively short time, in seconds or tens of seconds. However, few polymerization reactions are sufficiently rapid for use in the present invention.

The encapsulation of aerosols has been accomplished by a process coming within the scope of this invention through the utilization of the aerosol as a condensation nuclei on which organic monomers simultaneously polymerize and condense. More particularly, one embodiment of the process of this invention involves the encapsulation of aerosol products comprising intimately contacting the aerosols with unsaturated organic monomers, causing the monomers to condense and polymerize on the aerosols, thereby encapsulating the aerosol. The monomers utilized in this method are normally in the vapor phase and are reactive in the presence of additional substances which include boron trifluoride and nitrogen dioxide as will be explained hereinafter. What essentially transpires in the process described is a virtually instantaneous polymerization of monomers about the aerosol particles thereby encapsulating them.

An object of this invention is an encapsulation of highly reactive aerosol particles.

A further object of the invention is the encapsulation of aerosol products utilizing an instantaneous polymerization of monomers to so encapsulate the aerosol particles.

Another object of the present invention is to provide a method for encapsulating aerosols comprising the rapid polymerization from the vapor phase of unsaturated organic monomers in the presence of an aerosol.

Additional objects will become apparent from the following detailed description.

The aerosols which are encapsulated by the process of the invention are either solid or liquid colloidal suspensions in a gas. Such aerosols are generally found in chemical agents utilized for warfare, insecticides, and the like. The size of the particles in the aerosol varies and is often from 0.5 to 30 micron diameters. Particularly stable aerosols have particles of 1 to 10 micron diameters. In the specific examples of the invention, phosphoric acid is described as the aerosol which is encapsulated through the process of the invention. This aerosol was chosen for the examples because liquids are known to be more difficult to encapsulate than solids. Additionally, the phosphoric acid which was aerosolized bears some similarity to certain insecticides and chemical agents and thus serves as a good illustrative example. However, it should be made clear that the invention pertains to any aerosolized product and thus is not limited in its scope to the chemical nature of such compounds.

The monomers utilized in the invention to react and polymerize to form the encapsulation or shell for the aerosol are selected from the class consisting of (a) diolefins, (b) polyolefins, i.e., polyunsaturated compounds, (c) vinyl esters, and (d) esters of $\alpha,\beta$-unsaturated acids. The monomers have generally from 4 to 25 carbon atoms with preferably from 5 to 15 carbon atoms. These low weight monomers are preferred since the vapor pressure of higher ones becomes too small for practical use. Most preferred is the monomer isoprene because of its ease in handling and ready availability. These monomers may be substituted provided the functional groups are not disturbed or interfered with. The substituent groups may be selected from the class consisting of aromatic and aliphatic hydrocarbons having from 1 to 10 carbon atoms.

Generally the diolefins have the formula $C_nH_{2n-2}$ in which $n$ may vary from 4 to 25. Examples of the diolefins that may be utilized include: 1,3-butadiene; 2-methyl-1,3-butadiene (isoprene); 1,3-pentadiene; 1,3-hexadiene; 2,4-hexadiene, and the like.

The polyolefins utilized may be conjugated polyolefins having the general formula:

$$CH_3(CH_2)_y(CH=CH)_x(CH_2)_zCH_3$$

wherein:

$y$ is an integer from 1 to 5,
$x$ is an integer from 2 to 6,
$z$ is an integer from 1 to 5, such that the total number of carbon atoms is not greater than 25. Preferably, the polyolefin has from 10 to 25 carbon atoms. As can be seen, these are generally conjugated olefins which possess the necessary reactivity for the type of polymerization involved in the invention. Examples of the polyolefins include:

$$CH_3(CH_2)_2(CH=CH)_2(CH_2)_2CH_3$$
$$CH_3(CH_2)_3(CH=CH)_3(CH_2)_3CH_3$$
$$CH_3(CH_2)_5(CH=CH)_4(CH_2)_5CH_3$$

Tung oil was used in one of the following examples since it is a convenient source of an example of a long chain polyolefin. Tung oil contains a large fraction of the glyceride of eleostearic acid.

$$CH_3(CH_2)_3(CH=CH)_3(CH_2)_7$$

The vinyl esters that may be used in the process have the general formula $(ROOCH=CH_2)$ wherein R is an aliphatic or aromatic hydrocarbon preferably having from 1–15 carbon atoms. Included in these compounds are vinyl acetate, vinyl propionate, vinyl benzoate. Particularly preferred is the compound vinyl acetate which is highly reactive and thus easy to polymerize.

Non-limiting examples the esters of $\alpha,\beta$-unsaturated acids include methyl acrylate, ethyl acrylate, methyl crotonate, methyl methacrylate, ethyl methacrylate and the like.

All of the above-described compounds used to form the encapsulating polymers may be substituted with halogen atoms, hydrocarbon sidechains and any other nonreactive groups.

Preferred embodiments of this invention may be further broken down into three different approaches as follows:

(1) The polymerization reaction in the vapor phase of a diolefin or vinyl ester and nitrogen dioxide accompanied by simultaneous condensation on the aerosol particles at room temperature to yield the encapsulated aerosol.

(2) Thermal condensation of a conjugated polyolefin liquid (e.g., tung oil) on the aerosol droplets at a required temperature which may be as high as 200° C., then introducing nitrogen dioxide vapor to polymerize the polyolefin and yield encapsulated aerosol.

(3) The vapor phase polymerization reaction of a vinyl ester or an ester of an unsaturated acid with boron trifluoride and the aerosol mixed at room or ambient temperature to yield the encapsulated product.

As can be seen from the three basic approaches to the method of this invention, all involve the presence of either nitrogen dioxide or boron trifluoride. The nitrogen dioxide has the role of a reactant-catalyst in these reactions i.e., that of promoting polymerization of the polyolefin and at the same time entering into the reaction. The product of such reactions is a polymer containing nitro groups. This particular type reaction is known and described by G. Leonet in Chemie and Industrie, 57, 351 (1947); and by Badger, E. H. M., and Dryden, I. C. G., Trans. Faraday Soc. 35, 606 (1939). The boron trifluoride, on the other hand, appears to be a catalyst only, promoting polymerization but not occurring in the polymer products. Once again this particular reaction is known and reported in the literature, e.g., Burnett, G. W., Chem Soc. Quarterly Review, 4, 306 (1950).

The relative quantities of the monomer and catalyst reactants are not believed to be critical to the invention. However, it is desirable to approach a one-to-one mole ratio which appears to be the optimum. The optimum mole ratio of aerosol:monomer:catalyst is 2:1:1. As in many polymerization reactions, a wide latitude of mole ratios is permissible. The gaseous monomer and nitrogen oxide or boron trifluoride concentrations in the system may be varied between about .01% and 1% by volume. The principal limitation is the volatility of the reactants.

In carrying out the process, the minimum practical temperature is about 0° C., while the maximum temperature depends on the properties of the encapsulation materials and the particles. Generally, the property most affecting the maximum temperature is the thermal stability of the compounds utilized. For the low vapor pressure monomers specifically described herein, a maximum temperature would be about 165° C. Most of the reactions may be carried out at room or ambient temperatures. The pressure at which the reaction is carried out is not critical, though it is convenient to operate in the range of 5 to 50 p.s.i.a, with a preferred range being 10 to 25 p.s.i.a.

It is believed the invention will be better understood with relation to the following detailed examples in which a flow system was used to obtain the desired encapsulation.

The reaction chamber used in the following examples was in the form of an inverted vertical U and was constructed in three parts. The sides of the U consisted of vertical glass cylinders four centimeters in diameter and one meter long. These were bridged at the top with a polyethylene chamber of similar dimensions. Phosphoric acid aerosols were produced with a De Vilbiss No. 40 Nebulizer operating with nitrogen at a flow rate of 7 liters/minute. This produced a rather wide droplet size distribution with a number median diameter of about 3 microns. The organic vapors and the nitrogen dioxide utilized in this method were introduced by passing nitrogen through the corresponding liquid contained in a bubbler at constant temperature. This temperature was 0° C. for monomers other than butadiene. In the case of butadiene, a temperature of −80° C. was used.

The flow rate of the boron trifluoride utilized was measured by bubbling it through carbon tetrachloride. The bubble rate and bubble volume were determined and controlled to provide the desired rates.

Samples of the aerosol material were collected on Teflon slides inserted in the reaction chamber. Total times for the reactions including both the free flowing time and median time during which the slides were maintained in the reaction chamber varied from 3 to 10 minutes. It should be pointed out that the reaction time will vary—being less at higher temperatures as in most polymerization reactions.

The acid available in the samples from the encapsulating runs was compared with the acid available from blank (nonencapsulating) runs by titration with aqueous sodium hydroxide solution using phenolphthalein. The fraction encapsulated was considered to be the ratio of the amount of unavailable acid to the amount of acid in a blank run, the amount of the unavailable acid being the difference between the blank and the encapsulating runs. To confirm the repeatability of operating conditions, titrations were also made using acetone to dissolve capsules before adding water. Using this technique, the encapsulation runs and blank runs produced the same amounts of acid on the collection slides.

*Example 1*

The procedure and apparatus described above were utilized to produce an encapsulated aerosol utilizing isoprene vapor and nitrogen dioxide. In this example, the average droplet size of a liquid phosphoric acid aerosol was 3 microns and aerosol density was 0.6 mg./liter. The aerosol was passed into the chamber where it was mixed with 0.7 mg. isoprene/liter. About 0.4 mg./liter of nitrogen dioxide was added and mixed into the aerosol. The volume of the system utilized was selected to provide about 30 seconds residence or reaction time. The reaction was carried out at room temperature and one atmosphere pressure.

The emerging aerosol particles were collected by gravity settling and analyzed. The percentage by weight of the phosphoric acid encapsulated was 92%.

The process of this example was repeated using various concentrations (expressed in mg. per liter) of phosphoric, monomer and nitrogen dioxide. With a phosphoric acid concentration of 0.6, an isoprene concentration of 0.2 and a nitrogen dioxide concentration of 1.3, the percent encapsulation was 71. When the phosphoric acid concentration was 0.32, the isoprene concentration 0.2 and the nitrogen dioxide concentration 0.5, the percent encapsulation was 75. A phosphoric acid concentration of 0.6, an isoprene concentration of 0.2 and a nitrogen dioxide concentration of 1.3 gave a percent encapsulation of 77.

Example II

Encapsulation of phosphoric acid with butadiene was accomplished in the same manner as that described in Example I. In this example, the concentrations (expressed in mg. per liter) of the materials were as follows: phosphoric acid, 0.6, butadiene 0.5, and nitrogen dioxide 1.3. The reaction time in this example was one minute. The percentage by weight of the phosphoric acid which was encapsulated was 25%.

Example III

In this example, phosphoric acid was encapsulated according to the general procedure described in Example I. However, in this example vinyl acetate was polymerized using boron trifluoride as a catalyst. The concentrations (expressed in mg. per liter) of the materials were as follows: phosphoric acid 0.6, vinyl acetate 1.5, and boron trifluoride 1.2. The reaction time was three minutes. The percentage by weight of the phosphoric acid encapsulated was 35%.

Example IV

In this example, phosphoric acid was encapsulated with a methyl acrylate polymer according to the general procedure described in Example III. In this example, the concentrations of the materials (expressed in mg. per liter) were as follows: phosphoric acid 0.6, methyl acrylate 1.5 and boron trifluoride 1.2. The reaction time was three minutes. The percentage by weight of the phosphoric acid encapsulated was 40%.

Example V

In this example, phosphoric acid was encapsulated with vinyl acetate according to the general procedure described in Example I. The concentrations (expressed in mg. per liter) of the materials were as follows: phosphoric acid 0.6, vinyl acetate 1.5 and nitrogen dioxide 0.79. The reaction time was three minutes and percentage by weight of phosphoric acid which was encapsulated was 35%.

Example VI

The general procedure and apparatus used in Example I were used to encapsulate a liquid phosphoric acid aerosol. The average droplet size of the aerosol was 3 microns and the aerosol density was 0.6 mg./liter. The aerosol was passed into the chamber where it was mixed with tung oil vapor. The tung oil was heated to 160° C. and the tung oil vapor was carried by the aerosol stream to a superheater and heated to 200° C. The vaporized tung oil was condensed on the phosphoric acid aerosol as the gas-aerosol mixture passed into an insulated column. Nitrogen dioxide having a concentration of 6.5 mg./liter was added after condensation to polymerize the tung oil. The reaction time was 24 seconds. The percentage by weight of the phosphoric acid encapsulated was 63%.

In the process described, it should be pointed out that an important feature is the short reaction time. This is important because of the short practical residence time for polymerization about the aerosol particles to cause the encapsulation. In the previous examples and tests made, the residence time in the vessel and the flow rate control of the reactants regulated the reaction time. The reaction time may vary from 15 seconds to five minutes. As with any polymerization reaction, the reaction times are subject to considerable variation. In the present invention, it is desirable to achieve a fast reaction and polymerization. Further, it should be pointed out that in various other applications the encapsulation may be accomplished in an unbound volume element. For example, a chemical warfare aerosol may be inactivated by spraying the vapors of this invention into the air in which the aerosol is located to encapsulate and modify it.

The compositions of aerosols that may be encapsulated by the process are numerous and have not been gone into detail herein. The only criteria for the aerosol is that it be non-reactive with the encapsulating compounds used. Some of the particular compounds that are contemplated for the aerosols to be encapsulated include organic phosphites including particularly dibutyl phosphite and dioctyl phosphite; glycerine; tricresyl phosphate; phthalate esters including particularly dibutyl phthalate and dioctyl phthalate.

Having fully described the present invention, it is to be understood that it is not to be limited to the specific details set forth, but is of the full scope of the appended claims.

I claim:

1. The method of encapsulating aerosol products comprising: intimately contacting said aerosol particles with an unsaturated organic monomer selected from the group consisting of diolefins, polyolefins, vinyl esters and esters of $\alpha,\beta$-unsaturated acids, said monomers having from 4 to 25 carbon atoms, and causing said monomers to polymerize on said aerosol particles thereby encapsulating said aerosol particles.

2. The method of claim 1 wherein said monomer is in the vapor phase.

3. The method of claim 1 wherein said polymerization is preformed in the presence of a reaction promoter.

4. The method of claim 3 additionally comprising polymerizing said monomer in the presence of a compound selected from the class consisting of nitrogen dioxide and boron trifluoride.

5. The method of claim 4 wherein said nitrogen dioxide and boron trifluoride are in the vapor phase.

6. The method of encapsulating aerosol particles comprising: heating an organic monomer selected from the group consisting of diolefins, polyolefins, vinyl esters and esters of $\alpha,\beta$-unsaturated acids, said monomer having from 4 to 25 carbon atoms, vaporizing a catalytic compound selected from the class consisting of boron trifluoride and nitrogen dioxide, contacting said aerosol with said monomer and catalytic compound, and polymerizing said monomer about said particles thereby encapsulating same.

7. The method of claim 6 comprising reacting said aerosol particles, said monomer and said catalytic compound in a 2:1:1 mol ratio.

8. The method of claim 6 comprising reacting said compounds at room temperature.

9. The method of claim 6 wherein said monomer is isoprene and said catalyst is nitrogen dioxide.

10. The method of claim 6 wherein said monomer is butadiene and said catalyst is nitrogen dioxide.

11. The method of claim 6 wherein said monomer is vinyl acetate and said catalyst is boron trifluoride.

12. The method of claim 6 wherein said monomer is tung oil and said catalyst is nitrogen dioxide.

13. The method of claim 12 further comprising heating said tung oil to a temperature of at least 200° C. and condensing said tung oil prior to polymerization.

14. The method of claim 6 wherein said monomer is methyl acrylate and said catalyst is boron trifluoride.

15. The method of encapsulating aerosol particles comprising vaporizing a vinyl ester having from 4 to 25 carbon atoms, vaporizing boron trifluoride, mixing said ester and boron trifluoride with said aersol particles, and polymerizing said ester about said particles causing encapsulation thereof.

16. The method of encapsulating aerosol particles comprising vaporizing of vinyl ester from 4 to 25 carbon atoms, mixing said ester and nitrogen dioxide with said aerosol particles, and polymerizing said ester about said particles causing encapsulation thereof.

17. The method of encapsulating aerosol particles comprising: heating a polyolefin to at least 200° C., condensing said polyolefin on said particles, mixing nitrogen dioxide with said aerosol particles covered with said polyolefin, and polymerizing said polyolefin on said particles causing encapsulation thereof.

18. The method of claim 17 wherein said polyolefin is tung oil.

19. The method of encapsulating aerosol particles comvinyl acetate and said catalyst is nitrogen dioxide.

20. The method of encapsulating aerosol particles comprising: vaporizing an ester of an $\alpha\beta$,-unsaturated acid having from 4 to 25 carbon atoms, vaporizing boron trifluoride, mixing said ester and boron trifluoride with said aerosol particles, and polymerizing said ester about said particles causing encapsulation thereof.

21. The method of encapsulating aerosol particles comprising: vaporizing a diolefin of from 4 to 25 carbon atoms, mixing said diolefin and nitrogen dioxide with said aerosol particles, and polymerizing said diolefin about said particles causing encapsulation thereof.

References Cited by the Examiner
UNITED STATES PATENTS

| | | | |
|---|---|---|---|
| 2,270,285 | 1/1942 | Frolich | 117—106 X |
| 2,876,133 | 3/1959 | Iler et al. | 117—106 X |
| 2,998,391 | 8/1961 | Jones et al. | 252—305 |
| 3,009,826 | 11/1961 | Straughn et al. | 252—305 X |
| 3,124,505 | 3/1964 | Doyle et al. | 252—305 X |
| 3,159,874 | 12/1964 | Langen et al. | 264—4 |
| 3,173,829 | 4/1965 | Thien et al. | 117—100 |

WILLIAM D. MARTIN, *Primary Examiner.*